United States Patent

Lawson et al.

[11] Patent Number: 6,063,873
[45] Date of Patent: May 16, 2000

[54] PROCESS TO SCAVENGE AMINES IN POLYMERIC COMPOUNDS BY TREATMENT WITH TRIAZINE DERIVATIVES, AND COMPOSITIONS THEREFROM

[75] Inventors: David F. Lawson, Uniontown; Ashley S. Hilton, Massillon; John R. Schreffler, Clinton; Roderic P. Quirk, Akron, all of Ohio

[73] Assignee: Bridgestone Corporation, Tokyo, Japan

[21] Appl. No.: 09/002,054

[22] Filed: Dec. 31, 1997

[51] Int. Cl.[7] .................................................. C08C 19/22
[52] U.S. Cl. .................... 525/332.3; 152/450; 525/332.5
[58] Field of Search .............................. 525/332.3, 332.5, 525/332.6

[56] References Cited

U.S. PATENT DOCUMENTS

| | | | |
|---|---|---|---|
| 3,337,550 | 8/1967 | Yates | 525/347 |
| 3,692,711 | 9/1972 | Eaton | 525/347 |
| 3,894,019 | 7/1975 | Westlinning | 544/211 |
| 4,054,739 | 10/1977 | Haschke | 544/208 |
| 4,873,291 | 10/1989 | Cohen et al. | 525/348 |
| 5,070,130 | 12/1991 | Chasar | 524/430 |
| 5,070,131 | 12/1991 | Rhodes et al. | 524/484 |
| 5,126,385 | 6/1992 | Seibert et al. | 524/100 |
| 5,217,807 | 6/1993 | Steiber et al. | 428/378 |
| 5,283,274 | 2/1994 | Seibert et al. | 524/100 |
| 5,504,168 | 4/1996 | Maestri et al. | 526/83 |
| 5,658,990 | 8/1997 | Von Arndt et al. | 525/124 |
| 5,679,838 | 10/1997 | von Arndt et al. | 560/332 |

FOREIGN PATENT DOCUMENTS

| | | |
|---|---|---|
| 0 728 805 A1 | 8/1902 | European Pat. Off. . |
| 0 482 470 A1 | 4/1992 | European Pat. Off. . |
| 0 727 458 A1 | 8/1996 | European Pat. Off. . |
| 0 728 805 A1 | 8/1996 | European Pat. Off. . |
| 295 646 A5 | 10/1983 | German Dem. Rep. . |
| 61-136439 | 6/1986 | Japan . |
| 3-126536 | 5/1991 | Japan . |
| 4-75546 | 3/1992 | Japan . |

OTHER PUBLICATIONS

"*Nitrosamines in Rubber Vulcanizate: An Evaluation of Specific Inhibitors*" by Lheureux et al., (Fed. Rep. of Germany), pp. 107–113, Feb. 1990.

"*Inhibierung der Bildung von N–Nitrosaminen*", by Schuster et al., Beiträrage Papers (contains English language abstract), Feb. 1990.

*Primary Examiner*—Christopher Henderson
*Attorney, Agent, or Firm*—John H. Hornickel; Daniel N. Hall; Arthur M. Reginelli

[57] ABSTRACT

A rubber tread stock comprising a vulcanizable composition of matter, and a triazine, wherein said triazine is defined by the formula

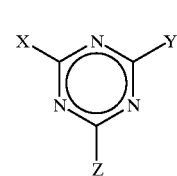

(I)

where X is selected from the group consisting of hydrogen, halides, amines, and organic groups having from 1 to about 20 carbon atoms, Y is selected from the group consisting of halides, alkoxy derivatives, amine derivatives, aryloxy derivatives, and urea derivatives, with the proviso that the substituent Y is displacable by a reaction with a secondary amine, and Z is selected from the group consisting of alkoxy derivatives, amino derivatives, aryloxy derivatives, and urea derivatives, with the proviso that the substituent Z is displacable by a reaction with a secondary amine.

18 Claims, No Drawings

PROCESS TO SCAVENGE AMINES IN POLYMERIC COMPOUNDS BY TREATMENT WITH TRIAZINE DERIVATIVES, AND COMPOSITIONS THEREFROM

TECHNICAL FIELD

The present invention is directed toward amine scavengers that are particularly useful in polymeric compositions. More specifically, the present invention is directed toward cyanurate or triazine compounds, and their use within polymeric compositions as amine scavengers.

BACKGROUND OF THE INVENTION

In the art of forming and compounding polymeric compositions, impurities can be introduced into the polymeric compositions. These impurities can include secondary and tertiary amines, and can stem from contamination, the use of amine-containing initiators, the presence of amine functionalized polymers, from various compounding additives such as accelerators, or from certain short-stopping reagents used in emulsion polymerization.

While it is known that amines will react with isocyanates, their use in polymeric compositions has not been found to be suitable. The literature has disclosed the use of several methods for trapping secondary amines within rubber compositions. These methods include reacting the secondary amines with isocyanates, or by acetylation with anhydrides. Such methods, however, have been unacceptable inasmuch as the use of anhydrides within rubber compositions results in poor distribution of the inhibitors, and the use of isocyanates tends to react with other rubber additives. Other known methods for removing amines from rubber compositions include the addition of aldehydes, as well as the addition of mono- functional or multi-functional isothiocyanates.

Often, however, the reactants that are added to rubber compositions for scavenging amine impurities have a deleterious impact on the rubber composition and its intended purpose. There is, therefore, a need for amine reactants that do not adversely impact the rubber compositions to which they are added.

SUMMARY OF INVENTION

It is, therefore, an object of the present invention to provide a process for increasing the purity of polymeric compositions by scavenging amines therein.

It is another object of the present invention to provide a process for increasing the purity of vulcanizable compositions by scavenging amines therein.

It is still another object of the present invention to provide a process for increasing the purity of rubber compounds that contain accelerators based on secondary amines.

It is yet another object of the present invention to provide a process for increasing the purity of rubber compounds that contain polymers having amino substituents.

It is still a further object of the present invention to provide novel amine scavengers that are particularly useful in polymeric compositions.

It is yet another object of the present invention to provide amine scavengers that are particularly useful in vulcanizable compositions of matter.

It is another object of the present invention to provide tire treadstocks and sidewall stocks having increased purity.

It is a further object of the present invention to provide a process for increasing the purity of polymeric and vulcanizable compositions of matter by scavenging amines therein without substantially affecting the composition or the ultimate use of the composition such as in a pneumatic tire.

At least one or more of the foregoing objects, together with the advantages thereof over the known art relating to processes for purifying rubber compositions, that shall become apparent from the specification which follows, are accomplished by the invention as hereinafter described and claimed.

In general the present invention provides a rubber tread stock comprising a vulcanizable composition of matter, and a triazine, wherein said triazine is defined according to the formula:

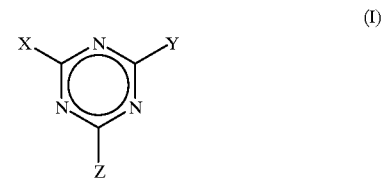

where X is selected from the group consisting of hydrogen, halides, amines, and organic groups having from 1 to about 20 carbon atoms, Y is selected from the group consisting of halides, alkoxy derivatives, amine derivatives, aryloxy derivatives, and urea derivatives, with the proviso that the substituent Y is displacable by a reaction with a secondary amine, and Z is selected from the group consisting of alkoxy derivatives, amino derivatives, aryloxy derivatives, and urea derivatives, with the proviso that the substituent Z is displacable by a reaction with a secondary amine.

The present invention also provides a rubber composition of matter comprising a triazine compound defined by the formula

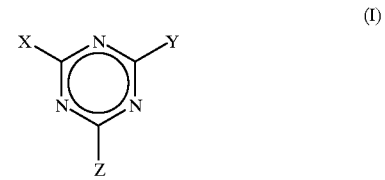

where X is selected from the group consisting of hydrogen, halides, and organic group having from 1 to about 20 carbon atoms, Y is selected from the group consisting of halides, alkoxy derivatives, amino derivatives, aryloxy derivatives, and urea derivatives, with the proviso that the substituent is displacable by a reaction with a secondary amine, and Z is an amine derivative that is defined by a formula selected from the group consisting of

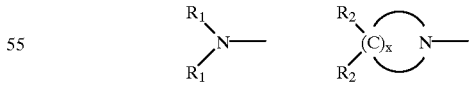

where $R_1$ is selected from the group consisting of hydrogen and organic groups having from about 2 to about 20 carbon atoms and $R_2$ is selected from the groups consisting of hydrogen and organic groups having from 1 to about 12 carbon atoms, and x is an integer from 1 to about 20.

PREFERRED EMBODIMENT FOR CARRYING OUT THE INVENTION

Polymeric compositions that contain accelerators based on secondary amines, those that are short-stopped with an amine, those that contain polymers containing amino substituents, or those that have been initiated with amine containing initiators, may contain small amounts of impurities such as secondary amines.

It has now been found that the addition of triazines to polymeric compositions is highly effective in reducing the quantities of amine impurities therein. Surprisingly, the addition of these triazine compounds does not lead to deleterious effects upon the polymeric composition, especially vulcanizable rubber compositions. Accordingly, the present invention is directed toward a process for reducing residual amines within polymeric compositions, as well as novel triazine scavenger compounds that have been found to be particularly useful in this process.

The process of the present invention involves the addition of triazines to polymeric compositions of matter. It is here noted that the use of the term triazine may be used interchangeably throughout this specification with the term cyanurate.

A variety of triazines, e.g., aryloxy triazines or alkoxy triazines, and related derivatives, are believed to be useful for practice of this invention. A general structure for the triazines of this invention can be represented by the following formula

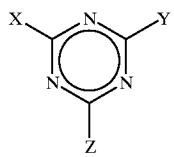

(I)

The substituent X is a non-specific substituent, meaning that its selection is not critical to the present invention so long as the substituent chosen will not deleteriously impact the composition to which the compounds of the present invention are added. As those skilled in the art will appreciate, X generally can include a hydrogen atom, an amine, an organic group, or a halide. To the extent that X is nonspecific, X can include any substituent that is specifically defined for the substituents Y and Z as defined hereinbelow.

The organic groups may, of course, contain hetero atoms such as oxygen, sulfur, or nitrogen. Preferably, the organic groups should include those having less than about 20 carbon atoms, more preferably those having from 1 to about 12 carbon atoms, and even more preferably those having from about 2 to about 8 carbon atoms. More specifically, the groups can be aliphatic, cyclic or aromatic. The aliphatic groups may be saturated or unsaturated and include alkyls, alkenyls, and alkynyls. As a non-limiting example, those skilled in the art will recognize that the above description encompasses groups including primary and secondary amine groups, carboxyl groups, alkoxy groups, and urea groups.

The substituent Y is more specifically defined because in accordance with the present invention the substituent Y must be displaced by a reaction with a secondary amine. Accordingly, as those skilled in the art will appreciate, the substituent Y can include a halide, especially chlorine or bromine, as well as, for example, groups based on O-alkyls, O-aryls, N-alkyls, N-aryls, N-carboxamides, and ureas. Those skilled in the art will also appreciate that any organic substituent having a hetero atom, such as oxygen, nitrogen, or sulfur that is tethered to the triazine ring will be displaced by a reaction with a secondary amine.

The alkyl and aryl groups of the O-alkyl, O-aryl, -alkyl, N-aryl, alkyl and aryl moieties are preferably those having from about 1 to about 12 carbon atoms for the alkyls, and from about 6 to about 20 atoms for the aryls. Preferably, the groups have from about 2 to about 8 carbon atoms for the alkyls, and from about 6 to about 15 carbon atoms for the aryls.

A variety of other derivatives of alkoxy-, amino-, aryloxy-, and/or halo-s-triazines and related compounds are also believed to be useful in this invention, especially those whose parent aryloxy groups have lower vapor pressures than phenol, such as long-chain alkylphenoxy-, anisyloxy-, and phenetoloxy-, and like derivatives. Alkoxy triazines (alkyl cyanurates) may also be useful in the invention, particularly if they contain higher alkyl side chains that will not volatilize appreciably on curing. Substituted cyanurates including C-alkoxy-, C-aryloxy-, C-amino- groups and the like can also be useful, provided that one or both of the C-aryloxy or C-alkoxy groups are still present for reaction with the residual amines. These cyanurates are expected to have advantages over simple halo-s-triazines, such as more solubility, handling ease, processability and compatibility with cure systems. To the extent that Z, which is defined hereinbelow, is also displacable by a reaction with a secondary amine, the substituent Y can include any group specifically defined for Z, hereinbelow.

Because the substituent Z is also displaced by a secondary amine, Z may be selected from the group of substituents defined previously for the substituent Y. In a preferred embodiment, Z will not include a halogen atom. In an especially preferred embodiment, Z is an amine or a substituent based on a O-aryl group, which also may be referred to as an aryl oxide. The nitrogen of the amine and the oxygen of the aryl oxide is tethered to the triazine ring, as discussed above with respect to the Y substituent groups. The most preferred amine substituents have a hydrogen atom bonded to the amino nitrogen tethered to the ring, while the other nitrogen substituent includes an organic group.

The preferred amine substituent groups can be described with reference to the following figures:

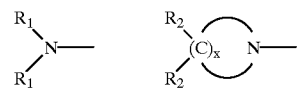

where $R_1$ is hydrogen or an organic group, preferably having from about 1 to about 20 carbon atoms, and $R_2$ is hydrogen or an organic group, preferably having from 1 to about 12 carbon atoms, and x is an integer from about 1 to about 20. In an especially preferred embodiment, $R_1$ is hydrogen or an organic group having from about 1 to about 12 carbon atoms, $R_2$ is hydrogen or an organic groups having from 1 to about 6 carbon atoms, and x is an integer from about 2 to about 12. As noted above, it is especially preferred that at least one $R_1$ include a hydrogen while the other $R_1$ include an organic group.

The term organic group is used in the same manner as described above, and therefore, encompasses hetero atoms, and can include alkyls, which are branched, cyclic, or straight chain, as well as aryl groups. It is here noted, and should be understood, that the cyclic structure identified above encompasses multi-cyclic compounds.

Accordingly, in one embodiment of the present invention, the triazine compounds can be selected from the following compounds:

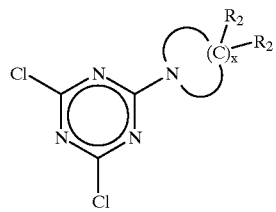
(II)

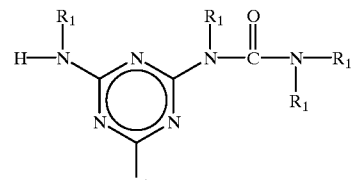
(VII)

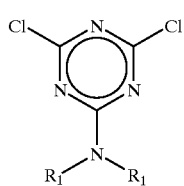
(III)

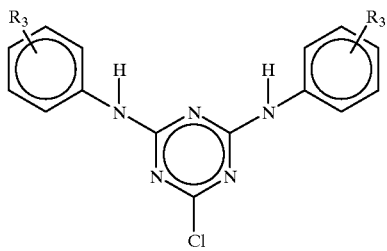
(VIII)

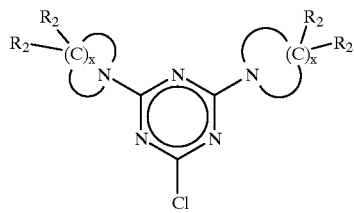
(IV)

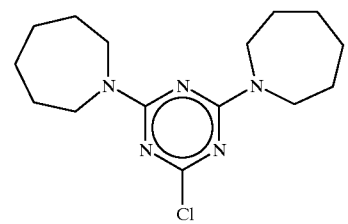
(IX)

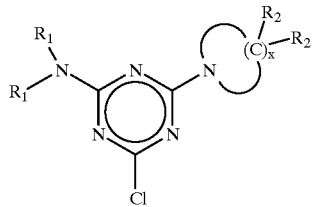
(V)

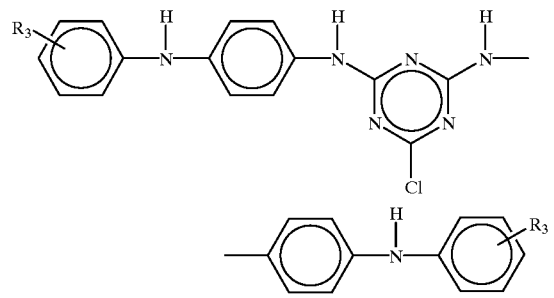
(X)

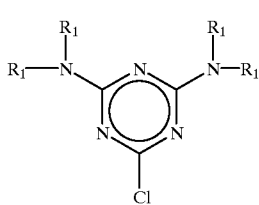
(VI)

where $R_1$ is hydrogen or an organic group, preferably having from 1 to about 20 carbon atoms, and $R_2$ is hydrogen or an organic group, preferably having from 1 to about 12 carbon atoms, and x is an integer from about 1 to about 20. It is especially preferred that $R_1$ is hydrogen or an organic group having from 1 to about 12 carbon atoms, $R_2$ is hydrogen or an organic group having from 1 to about 6 carbon atoms, and x is an integer from about 2 to about 12.

These foregoing compounds include, for example, the following compounds:

where $R_1$ is hydrogen or an organic group, preferably having from about 1 to about 20 carbon atoms, and $R_3$ is a hydrogen or an organic group, preferably having from 1 to about 12 carbon atoms. In an especially preferred embodiment, $R_1$ is hydrogen or an organic group having from 1 to about 12 carbon atoms, and $R_3$ is hydrogen or an organic group having from 1 to about 6 carbon atoms.

Another preferred embodiment of the present invention includes the phenoxy derivatives, which can generally be defined by the following:

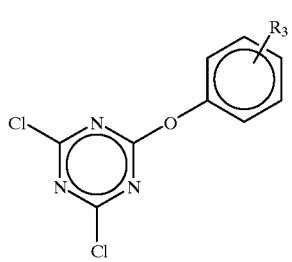
(XI)

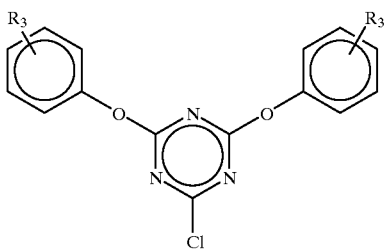

(XII)

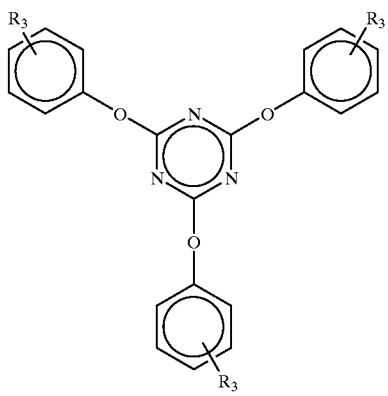

(XIII)

where $R_3$ is a hydrogen or an organic group, preferably having from 1 to about 12 carbon atoms. More preferably, $R_3$ is hydrogen or an organic group having from 1 to about 6 carbon atoms.

Still further, the following are exemplary compounds that fall within the scope of compounds that are useful for the present invention:

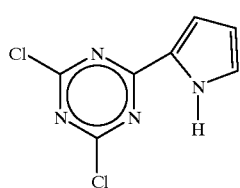

(XIV)

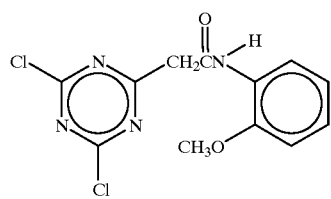

(XV)

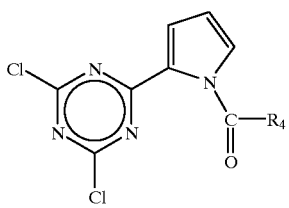

(XVI)

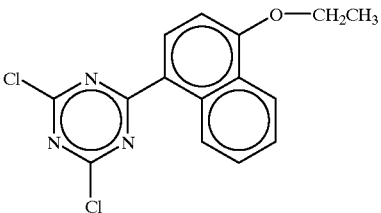

(XVII)

where $R_4$ is a hydrogen or an organic group, preferably having from 1 to about 12 carbon atoms. More preferably, $R_4$ is hydrogen or an organic group having from 1 to about 6 carbon atoms.

The effective level of use of the triazines of this invention can range from about 0.1 phr to 10 phr or more, depending on the amount of amine that must be removed and the equivalent weight of the triazine. The triazine additives can be added to polymeric compositions during post- polymerization finishing (e.g., before drying) of the polymer, or during compounding, e.g., in a Banbury as part of a masterbatch that generally includes the polymer, carbon black and processing aids, or at the final mixing stage, when accelerators, curatives and remaining ingredients are added.

The effect on amine reduction takes place during mixing for several of the triazines, such as the chloro-substituted compounds, and continues to increase during cure, while for other triazines, such as the phenoxy derivatives, the effect is brought about during cure. In some instances, the triazine additives may retard cure.

The reaction between the amines present in the polymeric composition and the triazine additives produces amino-substituted triazines. These amino-substituted triazines remain in the rubber or rubber compound and, surprisingly, do not have an adverse effect on the polymeric compositions. In some instances, cure rates may be retarded. In these cases, amino-substituted triazines may provide a benefit. For example, amino-substituted chloro triazines offset the adverse effect on cure occasioned by the presence of chloro triazines in the rubber.

Any polymeric composition can benefit from the practice of the present invention, especially, anionically-polymerized polymers, e.g., polybutadiene, polyisoprene and the like, and copolymers thereof with monovinyl aromatics such as styrene, alpha methyl styrene and the like, or trienes such as myrcene. Thus, the polymers include diene homopolymers and copolymers thereof with monovinyl aromatic polymers. Suitable monomers include conjugated dienes having from about 4 to about 12 carbon atoms and monovinyl aromatic monomers having about 8 to about 18 carbon atoms and trienes. Exemplary conjugated diene monomers include 1,3-butadiene, isoprene, 1,3-pentadiene, 2,3-dimethyl-1,3-butadiene and 1,3-hexadiene, and aromatic vinyl monomers include styrene, a-methylstyrene, p-methylstyrene, vinyltoluene and vinyinaphthalene. The conjugated diene monomer and aromatic vinyl monomer are normally used at the weight ratios of 95-50:5-50, preferably 95-65:5-35 to form copolymers. Polymers of conjugated dienes and copolymers thereof with monovinyl aromatic monomers that are polymerized in the presence of amine-functional initiators include those described in U.S. Pat. Nos. 5,329,005, 5,332, 810 and 5,393,721, disclosed hereinabove, the subject matter of which is incorporated herein by reference.

Another class of polymers are emulsion polymers and copolymers, such as the foregoing SBR copolymers of dienes and monovinyl aromatics. As is known, these polymers are initiated with free radical initiators and subsequently terminated by the addition of a short-stopping agent. Compounds derived from amines can be used for this purpose if they will react with the polymer free radicals to quench the polymerization. When reacted with polymer free radicals, some amine impurities may be formed that are residual in the polymer. Compositions of polymers made by other catalysts, e.g., Ziegler-Natta, can also benefit from the practice of the process of this invention.

The polymeric compositions treated with the triazines of the present invention find utility in the formation of rubber articles, particularly tires and tire components. Tire treads are one tire component that are advantageously manufactured from the low amine vulcanizable compounds of the present invention. Likewise, tires having such treads are also useful articles of the present invention. It is likewise particularly advantageous to use the low amine vulcanizable compounds of the present invention in the sub-tread or side-wall.

Accordingly, the polymers can be compounded with carbon black in amounts ranging from about 1 to about 100 parts by weight, per 100 parts of rubber (phr), with about 5 to about 80 parts being preferred and from about 35 to about 70 phr being more preferred. The carbon blacks may include any of the commonly available, commercially-produced carbon blacks, but those having a surface area (EMSA) of at least 20 $m^2/g$ and more preferably at least 35 $m^2/g$ up to 200 $m^2/g$ or higher are preferred. Surface area values used in this application are those determined by ASTM test D-1765 using the cetyltrimethyl-ammonium bromide (CTAB) technique. Among the useful carbon blacks are furnace black, channel blacks and lamp blacks. More specifically, examples of the carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which may be utilized include acetylene blacks. Mixtures of two or more of the above blacks can be used in preparing the carbon black products of the invention. Typical values for surface areas of usable carbon blacks are summarized in the following TABLE I.

TABLE I

CARBON BLACKS

| ASTM Designation (D-1765-82a) | Surface Area ($m^2/g$) (D-3765) |
|---|---|
| N-110 | 126 |
| N-220 | 111 |
| N-339 | 95 |
| N-330 | 83 |
| N-550 | 42 |
| N-660 | 35 |

The carbon blacks utilized in the preparation of the rubber compounds of the invention may be in pelletized form or an unpelletized flocculent mass. Preferably, for more uniform mixing, unpelletized carbon black is preferred. It should also be understood that it is common in the art to employ silica as a filler as well.

The reinforced rubber compounds can be cured in a conventional manner with known vulcanizing agents at about 0.5 to about 4 phr. For example, sulfur or peroxide-based curing systems may be employed. For a general disclosure of suitable vulcanizing agents one can refer to Kirk-Othmer, *Encyclopedia of Chemical Technology*, 3rd ed., Wiley Interscience, N.Y. 1982, Vol. 20, pp. 365–468, particularly "Vulcanization Agents and Auxiliary Materials" pp. 390–402. Vulcanizing agents may be used alone or in combination. Cured or crosslinked polymers may be referred to as vulcanizates for purposes of this disclosure.

Vulcanizable elastomeric or rubber compositions of the invention can be prepared by compounding or mixing the polymers thereof with carbon black and other conventional rubber additives such as fillers, plasticizers, antioxidants, curing agents and the like, using standard rubber mixing equipment and procedures and conventional amounts of such additives. Inasmuch as practice of the present invention is not limited by the preparation of such rubber compositions, as opposed to reduction of residual amines in the polymers, further compounding detail is not necessary. Reference to U.S. Pat. Nos. 5,329,005, 5,332,810 and 5,393,721, disclosed hereinabove, can be made.

GENERAL EXPERIMENTAL

EXAMPLES 1–9

To exemplify the invention, several triazines were added as amine scavengers within polymeric rubber compositions that were compounded. The polymers were prepared from amine initiators. The compounded polymers were analyzed in both the uncured and cured states for residual amine to determine the level of effectiveness of the treatments, i.e., compounding with the triazine scavengers. The levels of residual amine remaining after compounding the rubber with these derivatives were reduced by an amount ranging from about 40 to about 100 percent of that found in the absence of treatment.

Specifically, a styrene-butadiene copolymer was prepared by initiation with the lithium salt of hexamethyleneimine (HMI). At the end of polymerization, the cement from the polymer was coagulated in isopropyl alcohol, in the presence of di-t-butyl-p-cresol, at about 0.2% by weight of the rubber, and an antioxidant. A sample of the raw, dried polymer contained about 1–10 ppm of amine impurity.

For analysis, amine residues were extracted from the compounds and determined by formation of their dinitrophenyl derivatives using Sanger's reagent, followed by their separation and detection by HPLC (High Pressure Liquid Chromatographic) at 385 nm.

The styrene-butadiene copolymer thus prepared was mixed with typical tire recipe ingredients as reported in Table II, hereinbelow. A sample of the uncured compound that was formulated by mixing the foregoing SBR polymer with the compounding ingredients of the formulation in Table II (without added cyanurate) contained about 9.2 ppm of free amine, as reported in the Controls identified in Table III, hereinbelow.

TABLE II

EXPERIMENTAL TEST FORMULATION

| Ingredient | Mix Order | PHR | |
|---|---|---|---|
| Polymer | 1 | 100 | |
| Carbon Black, N351 | 2 | 10 | |
| Paraffinic Oil | added | 55 | |
| Experimental Additive (optional) | with Carbon Black | as indicated | |
| ZnO | 4 | 3 | Masterbatch, 60 RPM, 150–170° C. |
| Antioxidant | 5 | 1 | |
| Wax | 6 | 2 | |
| | Total Masterbatch: | 171 (±cyanurate) | |
| Stearic Acid | | 2 | |
| Sulfur | | 1.5 | |
| Accelerator (N-t-butyl-MBT sulfenamide) | | 1 | Final 40 RPM, 77–95° C. |
| | Total Final: | 175.5 (±cyanurate) | |

Triazine reagents were added at masterbatch in a Brabender mixer. Alternatively, the additives can also be incorporated in the dry rubber before compounding. The conditions for mixing the recipes reported in Table II included: masterbatch, 5 min, drop at 170° C.; final, 3 min, drop at 95° C.

The amounts of free amine present before and after curing of the recipe is reported for each example in Table III. As can be seen, Table III also identifies the triazine scavenger reagent that was added, as well as the relative amount of the reagent that was added.

ppm of free amine prior to curing. This equates to a reduction of amine content of about 44 percent by weight. However, no free amine could be detected in the stock containing the triphenyl cyanurate after it was cured for 30 minutes at 165° C. This equates to a 100 percent reduction of the residual amine content. Example 3 provided about a 97 percent reduction in residual free amine in a test of the uncured, compounded stock, and essentially complete elimination of free amine in the cured stock. Cyanuric chloride also markedly retarded the cure rate.

Examples 4–9 were aimed at probing structural factors in the triazines. They showed that triazines containing alkyl- or

TABLE III

ANALYSES OF AMINES IN COMPOUNDED STOCKS OF SBR CONTAINING VARIOUS POTENTIAL AMINE-SCAVENGERS

| Example | Added Reagent | Amt, phr | ppm HMI found Raw Cpd | ppm HMI found Cured Cpd | Rheometer $t_{50}$ Min |
|---|---|---|---|---|---|
| 1 | none (control) | — | 9.2 | 1.19 | 5:16 |
| 2 | 2,4,6-triphenoxy-1,3,5-triazine | 1 | 5.2 | 0.00 | 5:36 |
| 3 | cyanuric chloride | 1 | 0.3 | 0.00 | 9:22 |
| 4 | none (control) | — | 4.4 | 1.8 | 5:11 |
| 5 | 2-chloro-6-methoxypyridine | 0.5 | 3.8 | 1.8 | 5:07 |
| 6 | 1-ethoxy-4(dichloro-triazinyl)naphthalene | 0.5 | <0.3 | <0.3 | 6:47 |
| 7 | 2,4-dichloropyrimidine | 0.5 | 4.2 | 1.4 | 5:42 |
| 8 | (dichloro-triazinyl)-o-acetanisidide | 0.5 | 1.3 | <0.3 | 5:36 |
| 9 | cyanuric chloride | 0.5 | <0.3 | <0.3 | 5:59 |

It should be noted that the lower level of detection in Examples 1–3 was about 0.2 ppm, and that for Examples 4–9 was about 0.3 ppm. The cured compounds for Examples 1–9 were achieved after a 30 minute cure at 165° C.

Example 1 was a Control that was a sample of the composition without any additive that was cured for 30 minutes at 165° C. and contained about 1.2 ppm of free amine. In Example 2, an uncured stock of this formulation that was mixed with 1 part by weight of 2,4,6-triphenoloxy-1,3,5-triazine (also known as triphenyl cyanurate) per hundred parts by weight of rubber (phr) contained about 5.2 aryl-substituents can also be very effective as amine traps. In fact, free amines in the cured compounds of Examples 6 and 8 were reduced to lower than detectable levels. This corresponded to decreases in the free amine levels of from about 70 to about 93+percent. They also showed that the triazines work at levels at least as low as about 0.5 phr. The compounds of Examples 5 and 7, (Poly)chlorinated pyridines and pyrimidines, although superficially similar to triazines, are considerably less effective than the triazines as traps for residual amines. They decreased the level of residual free amine by only about 5 to about 15 percent in the uncured samples, and only up to about 22 percent in the cured samples. Examples 6 and 8 exhibited decreased cure rates. Example 8 showed very little reduction in cure rate, and Example 9 confirmed the outstanding effectiveness of cyanuric chloride at about 0.5 phr.

It should be readily recognized that although these Examples were shown to afford a significant reduction of a specific secondary amine, they will similarly reduce the levels of a broad number of secondary amines that may be present in rubber compositions at varying levels.

EXAMPLE 10–16

In further experimental examples, polymer compositions were prepared similar to those of Examples 1–9 above, using a different sample of the same type of amine-initiated SBR polymer described in the formulation of Table II. In Examples 11 and 12, however, the amounts of added 2,4,6-triphenoxy-1,3,5-triazine were varied. In examples 13–16, mono chloro, bis(amino)triazines were incorporated, both with and without additional 2,4,6-triphenoxy-1,3,5-triazine. In Example 10, a comparative example was prepared as a control with no triazine additives.

By comparing the amounts of free amine found in the cured rubber compounds of Examples 10, 11, and 12, it can be seen that the phenoxy triazine reduced the free amine content by 60–80 percent. In this case, the extent of effectiveness was also related to the relative concentration of the triazine in the rubber compound. By comparing Examples 13–16 with Example 10, it is readily seen that the compounds that were added are highly effective in improving the rubber compounds by eliminating all but traces of free amine from the cured compounds. They also reduce the free amine content of the raw compounds by over 50 percent. As pointed out earlier, the chloro triazines cause a slight retardation of cure. Additional experiments showed that cure retardation could be offset by incorporating from about 0.2 to about 2 phr of an alkaline earth metal oxide, hydroxide, or carbonate with the chloro triazine in the rubber composition. These additives can include, for example, calcium oxide, magnesium oxide, and calcium hydroxide.

The amounts of free amine present before and after curing of the recipe is reported for each example in Table III. As can be seen, Table III also identifies the triazine scavenger reagent that was added, as well as the relative amount of the reagent that was added.

EXAMPLE 17–27

In the following examples, triazines were incorporated into rubber compositions that contained an accelerator capable of forming a secondary amine upon decomposition. Two different recipes were used, as summarized in Table VI. Both recipes used a mixture of standard SBR polymers that do not contain amines. The source of secondary amine for these experiments was morpholine disulfide, which forms some morpholine upon decomposition.

TABLE VI

EXPERIMENTAL TEST FORMULATION

| Ingredient | | PHR | |
|---|---|---|---|
| Polymer | SBR A | 75 | |
| | SBR B | 25 | Masterbatch |
| Carbon Black, N343 | | 48 | 5–6 min, |
| Aromatic Oil | | 2 | 150–180° C. |
| Naphthenic oil | | 5.25 | Sheet on mill |
| ZnO | | 3 | 70–100° C. |
| Antioxidant | | 0.95 | |
| Wax | | 1 | |
| Total Masterbatch: | | 160.20 | |

| | | Ex. 17, 19 | | Ex. 18, 20–27 | |
|---|---|---|---|---|---|
| Stearic Acid | | 1.5 | | — | |
| Sulfur | | 2 | | 2 | Final on |
| Accelerator(s) | MBTS[a] | 0.5 | CBS[b] | 1.4 | mill |
| | | | DPG[c] | 0.1 | 70–100° C. |
| Morpholine disulfide | | 0.5 | | 0.05 | |
| Total Final: | | 164.7 | | 163.75 | |

[a]MBTS = Mercaptobenzothiazyl disulfide
[b]CBS = N-cyclohexylbenzothiazyl-sulfenamide
[c]DPG = Diphenyl guanidine Several comparative examples were also formulated: Examples 17 and 18, containing morpholine disulfide, but no added triazine, and Example 27, containing no morpholine disulfide or added triazine. These are intended to serve as controls for the experiments. The experimental results are summarized in Table VII, hereinbelow.

TABLE V

ANALYSES OF AMINES IN COMPOUNDED STOCKS OF SBR CONTAINING VARIOUS TRIAZINES

| Example | Added Reagent | Amt, phr | ppm HMI found Raw Cpd | ppm HMI found Cured Cpd | Rheometer $t_{50}$ min |
|---|---|---|---|---|---|
| 10 | none (control) | — | 16.5 | 5.2 | 10:20 |
| 11 | 2,4,6-triphenoxy-1,3,5-triazine | 0.5 | 16.4 | 1.2 | 10:19 |
| 12 | 2,4,6-triphenoxy-1,3,5-triazine | 0.2 | 21.5 | 2.2 | 10:29 |
| 13 | 2-chloro-4,6-bis(anilino)-1,3,5-triazine | 0.5 | 7.6 | trace | 12:51 |
| 14 | 2-chloro-4,6-bis(anilino)-1,3,5-triazine + 2,4,6-triphenoxy-1,3,5-triazine | 0.5 0.5 | 6.3 | trace | 12:17 |
| 15 | 2-chloro-4,6-bis(N-phenyl-p-phenylenediamino)-1,3,5-triazine + 2,4,6-triphenoxy-1,3,5-triazine | 0.5 0.5 | 6.4 | trace | 11:33 |
| 16 | 2-chloro-4,6-bis(N-phenyl-p-phenylenediamino)-1,3,5-triazine | 0.5 | 6.4 | trace | 11:53 |

TABLE VII

ANALYSES OF AMINES IN COMPOUNDED STOCKS OF SBR CONTAINING VARIOUS TRIAZINES

| Example | Added Reagent | Amt, phr | Added Morpholine Disulfide, phr | ppm morpholine found Raw Cpd | ppm morpholine found Cured Cpd | Rheometer $t_{50}$ min |
|---|---|---|---|---|---|---|
| 17 | Control (a) | — | 0.5 | 1323 | 505 | 11.25 |
| 18 | Control (b) | — | 0.05 | 103 | 21.7 | 5:14 |
| 19 | 2-chloro-4,6-bis(N-hexamethyleneimino)-1,3,5-triazine | 1.0 | 0.5 | 1417 | 349 | 12:10 |
| 20 | 2-chloro-4,6-bis(N-hexamethyleneimino)-1,3,5-triazine | 1.0 | 0.05 | 129 | 9.4 | 5:25 |
| 21 | 2-chloro-4,6-bis(N-hexamethyleneimino)-1,3,5-triazine | 0.5 | 0.05 | 140 | 10.8 | 5:31 |
| 22 | 2-chloro-4,6-bis(N-hexamethyleneimino)-1,3,5-triazine | 0.1 | 0.05 | 161 | 12.8 | 5:23 |
| 23 | 2-chloro-4,6-bis(N-phenyl-p-phenylenediamino)-1,3,5-triazine | 1.0 | 0.05 | 129 | 2.3 | 6:20 |
| 24 | 2-chloro-4,6-bis(N-phenyl-p-phenylenediamino)-1,3,5-triazine | 0.5 | 0.05 | 127 | 11.2 | 6:07 |
| 25 | 2-chloro-4,6-bis(anilino)-1,3,5-triazine | 1.0 | 0.05 | 153 | 0.96 | 7:39 |
| 26 | 2-chloro-4,6-bis(anilino)-1,3,5-triazine | 0.5 | 0.05 | 112 | 1.8 | 5:59 |
| 27 | Control (c) | — | 0.00 | 0 | 0.4 | 4:50 |

Comparison of Examples 17 and 19, containing 0.5 phr of morpholine disulfide shows that 2-chloro-4,6-bis(N-hexamethyleneimino)-1,3,5-triazine present at 1 phr had the effect of reducing the amount of residual, free morpholine in the cured compound by about 30 percent. It had little effect on morpholine content in the raw rubber compound.

The remaining examples showed the effectiveness of several different mono chloro, bis(amino)triazines in reducing the amount of residual free morpholine formed by decomposition of morpholine disulfide at 0.05 phr. In fact, all the chloro amino triazines reduced the residual morpholine. In Examples 18, 20, 21 and 22, 2-chloro4,6-bis(N-hexamethyleneimino)-1,3,5-triazine present at from about 0.1 to about 1 phr caused reductions of about 40 to about 50 percent of the residual morpholine in the cured compounds. Notably, it had no apparent effect on the cure rate.

Examples 18, 23, 24, 25, and 26 show the effectiveness of two additional chloro-amino triazines. 2-chloro-4,6-bis(N-phenyl-p-phenylenediamino)-1,3,5-triazine at 0.5 phr produced about a 50 percent reduction in residual morpholine in the cured compound. At 1 phr, the same compound reduced residual morpholine by almost 90 percent.

A similar compound, 2-chloro-4,6-bis(anilino)-1,3,5-triazine, showed still greater efficiency, reducing residual morpholine in the cured compound by about 90 percent at a loading of 0.5 phr, and by about 90 percent at a loading of 1 phr. Both of the latter additives apparently produced small reductions in the rate of cure, although the effect was minor when the additive was present at 0.5 phr. As noted above, these slight reductions in rate of cure can be offset by the addition of a small amount of alkaline earth metal compounds such as $CaCO_3$, CaO, or MgO.

The foregoing examples also point out that there is some relationship between the structure of the triazine derivative and its effectiveness in a compound. Triazines with aryloxy, aliphatic amino or cyclo aliphatic amino substituents have the least adverse effect on cure rates. Of the chloroamino triazines, those with amino substituents having a hydrogen bonded to the amine nitrogen, showed the greatest effectiveness.

Surprisingly, aliphatic amino substituents promoted greater solubility and better dispersion of the triazine in the rubber compound. Aliphatic amino substituents with relatively long chains showed the best dispersion.

Analytical Procedure

The procedure for the high pressure liquid chromatographic (HPLC) determination of secondary amines in gum, compounded and cured rubber stocks employed to report the residual amine contents hereinabove was as follows. It is to be noted this procedure is applicable to most secondary amines.

Standard Preparation

Prepare a stock solution of secondary amine in ethanol. Weigh about 0.15 g of secondary amine into a 50 ml serum vial and record weight to nearest 0.0001 g. Add ethanol to vial until nearly fill. Weigh amount of ethanol. Heat a portion of this solution in a sealed serum vial at 60° C. for a minimum of 30 minutes to convert the secondary amine to the dintrobenzene (DNB) derivative. Analyze this solution by HPLC to determine the retention time and response factor.

Prepare a solution to determine the amine response factor for HPLC by weighing about 0.15 g (to nearest 0.0001 g) of the stock solution above into a 100 ml volumetric flask, adding 0.3 ml of the 2,4-dinitrofluorobenzene (DNFB) reagent, and filling to the mark with ethanol. Heat a portion of this solution in a sealed serum vial at 60° C. for a minimum of 30 minutes to convert the secondary amine to the DNB derivative. Analyze this solution by HPLC to determine the retention time and response factor.

Sample Preparation

Cut sample into small pieces to maximize surface area. Weigh 3.5–4.5 grams to the nearest 0.0001 g of the sample and wrap in ashless filter paper to fit into the extraction thimble. Place extraction thimble containing the sample into the Soxhlet extractor.

Add 22 ml toluene, (85–90) ml ethanol, and 0.3 ml of the DNFB reagent to a 125 ml flat bottom flask. Attach to extraction tube from 4.1 and connect to cold water condenser. Extract for a minimum of 3.5 hours.

Concentrate extract to less than 20 ml and quantitatively transfer to a 25 ml volumetric flask. Dilute to mark with absolute ethanol. Mix thoroughly.

Transfer an appropriate portion of the diluted extract to an autosampler vial by filtering through a 0.25 µteflon filer.

Determine secondary amine as the DNFB derivative in filtrate by HPLC.

The HPLC Analysis Procedure

The HPLC parameters employed were as follows: injection size=10 μL; Flow=1.3 ml/min; detection at 385 nm; and gradient as set forth in Table II. The chromatographic column was Supelco LC-18DB (25 cm×4.6 mm; 5 μparticle size).

TABLE IX

HPLC GRADIENT

| TIME | % ACETONITRILE | % METHANOL | % WATER |
|---|---|---|---|
| 0 min. | 40 | 20 | 40 |
| 10 | 40 | 20 | 40 |
| 25 | 85 | 15 | 0 |
| 30 | 85 | 15 | 0 |
| 35 | 100 | 0 | 0 |
| 40 | 100 | 0 | 0 |
| 42 | 40 | 20 | 40 |
| 50 | 40 | 20 | 40 |

Results: secondary amine elutes at 11.8 minutes using the preceding conditions and column. The limit of detection (LOD) using the procedure described in this document should be about 0.6 ppm. The LOD could be lowered somewhat by modification of the procedure. Calculation of results will be determined by the manner in which the HPLC data is handled.

Thus it should be evident that the processes of the present invention are highly effective in reducing or eliminating secondary and tertiary amines in rubber polymers and rubber compounds. The invention is suited for the manufacture of rubber stocks and articles free from metal reinforcement, such as tread stocks for tires, but is not necessarily limited thereto. The process of the present invention can be used with a variety of rubber polymers containing amines either from initiation, termination of polymerization or as a result of compounding with accelerators.

Based upon the foregoing disclosure, it should now be apparent that the use of the triazines described herein will carry out the objects set forth hereinabove. It is, therefore, to be understood that any variations evident fall within the scope of the claimed invention and thus, the selection of specific rubber polymers and triazine compounds can be determined without departing from the spirit of the invention herein disclosed and described. For example, chlorine substituents of the preferred embodiments can be substituted with other halides such as bromine. Thus, the scope of the invention shall include all modifications and variations that may fall within the scope of the attached claims.

What is claimed is:

1. A rubber tread stock comprising:

a vulcanizable composition of matter that is devoid of metal reinforcement, and a triazine compound that is selected from the group consisting of

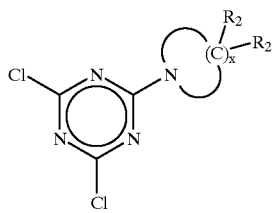
(II)

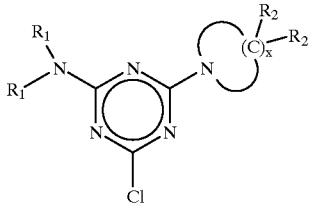
(V)

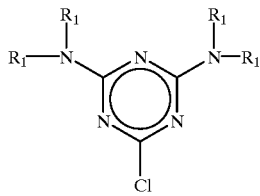
(VI)

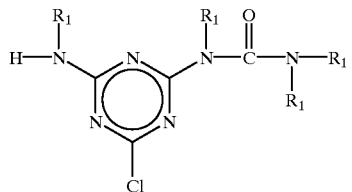
(VII)

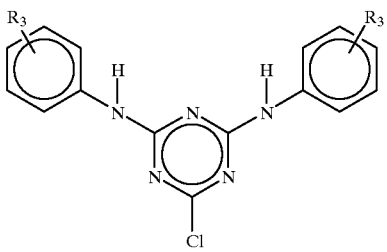
(VIII)

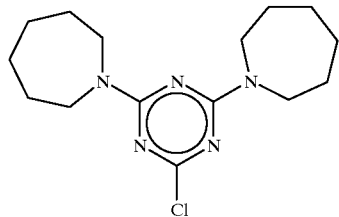
(IX)

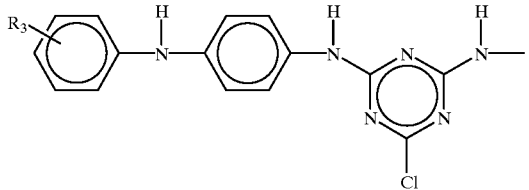
(X)

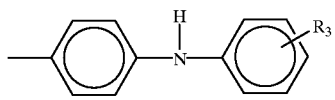 (XI)

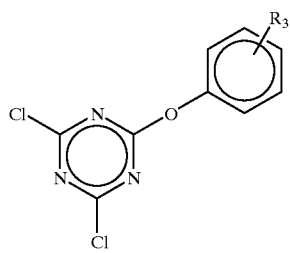 (XII)

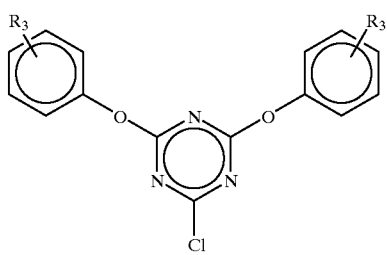 (XIII)

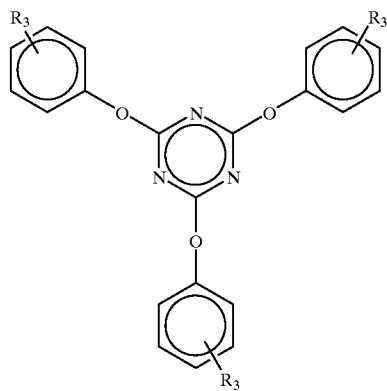 (XIV)

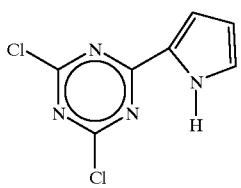

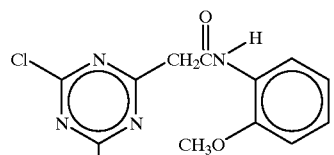 (XV)

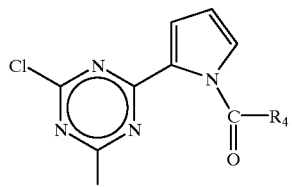 (XVI)

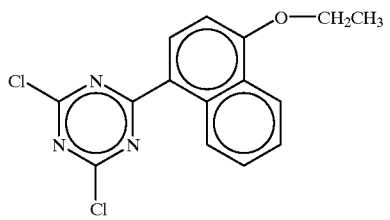 (XVII)

where $R_1$ is selected from the group consisting of hydrogen and organic groups having from 1 to about 20 carbon atoms, $R_2$ is selected from the group consisting of hydrogen and organic groups having from 1 to about 12 carbon atoms, and x is an integer from 1 to about 20, $R_3$ is selected from the group consisting of hydrogen and organic groups having from 1 to about 12 carbon atoms, $R_4$ is selected from the group consisting of hydrogen and organic groups having from 1 to about 12 carbon atoms, and x is an integer from 2 to about 12.

2. A rubber tread stock, as set forth in claim 1, where said triazine is selected from the group consisting of 2-chloro-4,6 bis(N-hexamethyleneimino)-1,3,5-triazine, 2-chloro-4,6-bis (anilion)-1,3,5-triazine, 2-chloro-4,6-bis(N-phenyl-p-phenylenediamino)-1,3,5-triazine, 2,4,6-triphenoxy-1,3,5-triazine, 1-ethoxy-4(dichloro-triazinyl)naphthalene, and (dichloro-triazinyl)-o-acetanisidide.

3. A rubber tread stock, as set forth in claim 1, where said triazine is 2-chloro-4,6 bis(N-hexamethyleneimino)-1,3,5-triazine.

4. A rubber tread stock, as set forth in claim 1, where said triazine is 2,4,6-triphenoxy-1,3,5-triazine.

5. A rubber tread stock, as set forth in claim 1, wherein said vulcanizable composition of matter includes an elastomer selected from natural and synthetic rubber.

6. A rubber tread stock, as set forth in claim 5, wherein said vulcanizable composition of matter further includes a filler selected from the group consisting of carbon black and silica.

7. A rubber composition of matter comprising:
a triazine compound defined by the formula

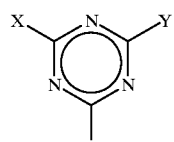 (I)

where X is selected from the group consisting of hydrogen, halides, and organic group having from 1 to about 20 carbon atoms, Y is selected from the group consisting of halides, alkoxy derivatives, amino derivatives, aryloxy derivatives, and urea derivatives, with the proviso that the substituent is displacable by a reaction with a secondary amine, and Z is an amine derivative that is defined by a formula selected from the group consisting of

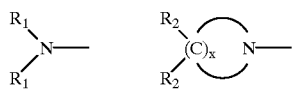

where $R_1$ is selected from the group consisting of hydrogen and aliphatic organic groups having from about 1 to about 20 carbon atoms and $R_2$ is selected from the groups consisting of hydrogen and organic groups having from 1 to about 12 carbon atoms, and x is an integer from 1 to about 20.

8. A tire component comprising:

a rubber vulcanizate that is devoid of metal reinforcement and that includes the reaction product between an amine compound and a triazine, where said triazine is a compound selected from the group consisting of (II)
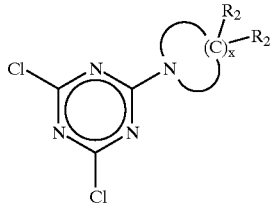

(V)
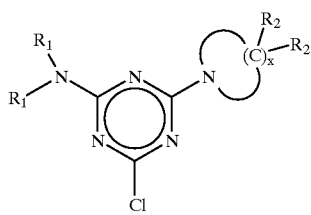

(VI)
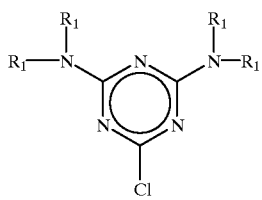

-continued (VII)
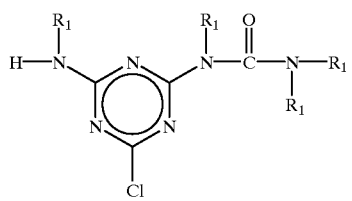

(VIII)
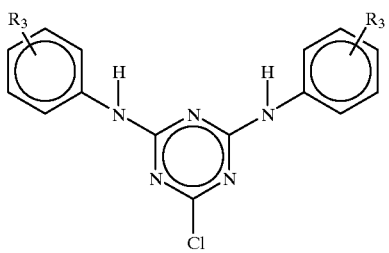

(IX)
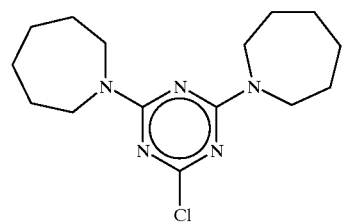

(X)
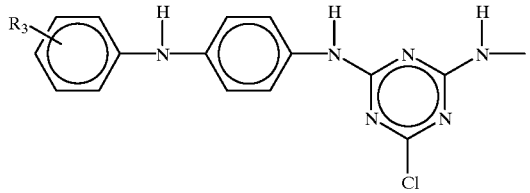

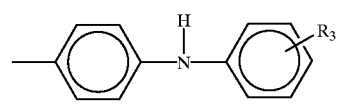

(XI)
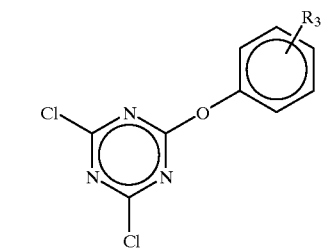

(XII)
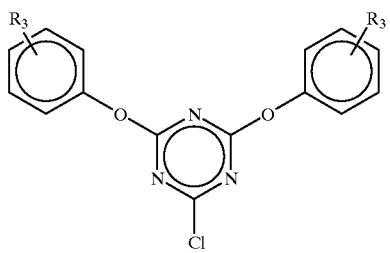

-continued

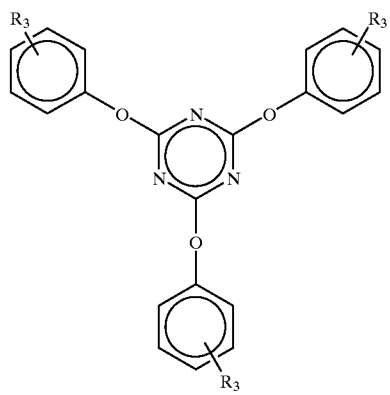
(XIII)

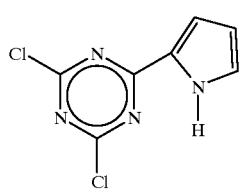
(XIV)

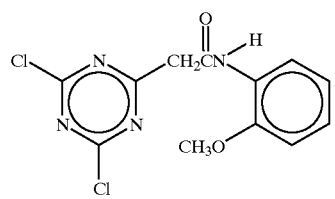
(XV)

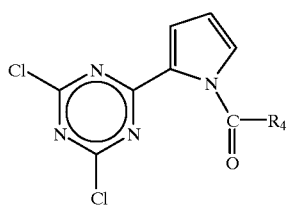
(XVI)

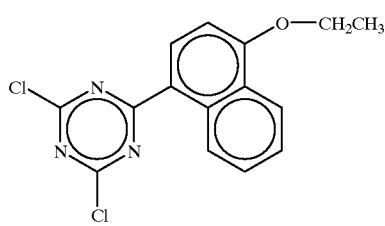
(XVII)

where $R_1$ is selected from the group consisting of hydrogen and organic groups having from 1 to about 20 carbon atoms, $R_2$ is selected from the group consisting of hydrogen and organic groups having from 1 to about 12 carbon atoms, and x is an integer from 1 to about 20, $R_3$ is selected from the group consisting of hydrogen and organic groups having from 1 to about 12 carbon atoms, $R_4$ is selected from the group consisting of hydrogen and organic groups having from 1 to about 12 carbon atoms, and x is an integer from 2 to about 12.

9. A tire component, as set forth in claim 8, where said triazine is selected from the group consisting of 2-chloro-4,6 bis(N-hexamethyleneimino)-1,3,5-triazine, 2-chloro-4,6-bis (anilino)-1,3,5-triazine, 2-chloro-4,6-bis(N-phenyl-p-phenylenediamino)-1,3,5-triazine, 2,4,6-triphenoxy-1,3,5-triazine, 1-ethoxy-4(dichloro-triazinyl)naphthalene, and (dichloro-triazinyl)-o-acetanisidide.

10. A tire component, as set forth in claim 8, where said triazine is 2-chloro4,6 bis(N-hexamethyleneimino)-1,3,5-triazine.

11. A tire component, as set forth in claim 8, where said triazine is 2,4,6-triphenoxy-1,3,5-triazine.

12. A tire component, as set forth in claim 8, where said rubber vulcanizate is formed from an elastomer selected from natural and synthetic rubber.

13. A tire component, as set forth in claim 12, where said rubber vulcanizate further includes a filler selected from the group consisting of carbon black and silica.

14. A tire tread prepared by the steps comprising:

adding a triazine compound to a rubber tread stock to thereby scavenge free amine that may exist within the tread stock, and fabricating a tire tread from said tread stock, that is devoid of metal reinforcement where said triazine is selected from the group consisting of

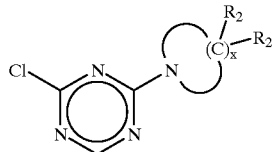
(II)

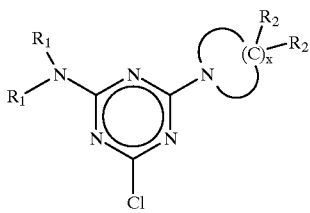
(V)

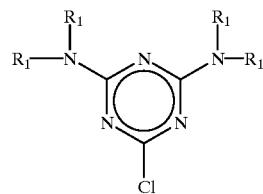
(VI)

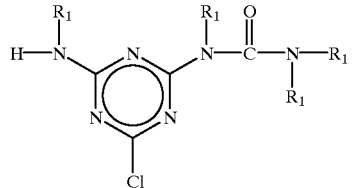
(VII)

-continued (VIII)
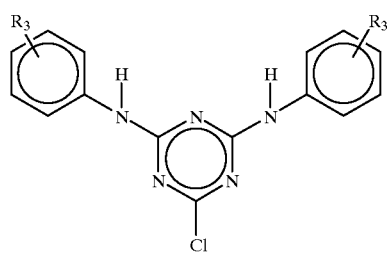

(IX)
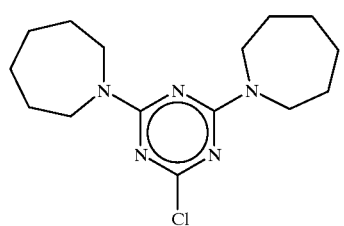

(X)
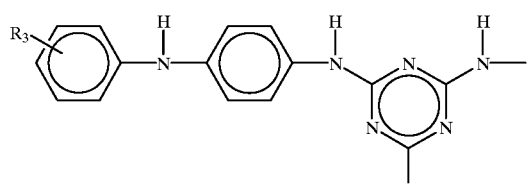

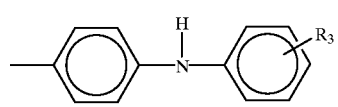

(XI)
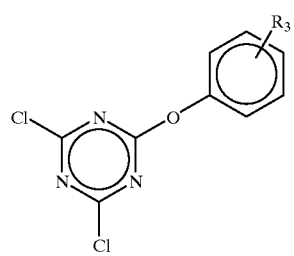

(XII)
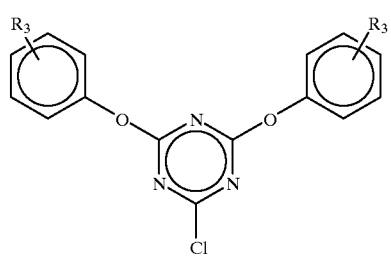

-continued (XIII)
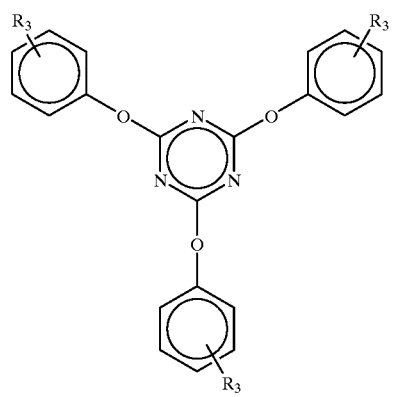

(XIV)
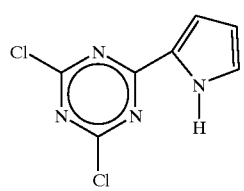

(XV)
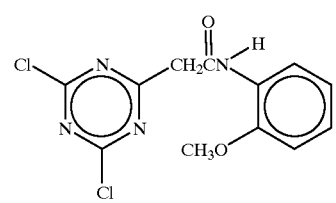

(XVI)
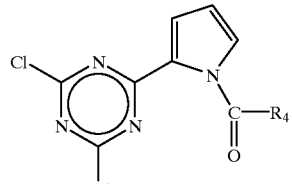

(XVII)
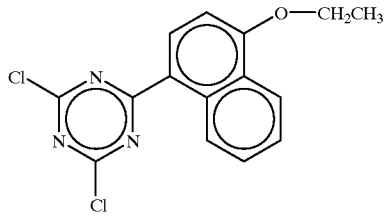

where $R_1$ is selected from the group consisting of hydrogen and organic groups having from 1 to about 20 carbon atoms, $R_2$ is selected from the group consisting of hydrogen and organic groups having from 1 to about 12 carbon atoms, and x is an integer from 1 to about 20, $R_3$ is selected from the group consisting of hydrogen and organic groups having from 1 to about 12 carbon atoms, $R_4$ is selected from the group consisting of hydrogen and organic groups having from 1 to about 12 carbon atoms, and x is an integer from 2 to about 12.

15. A tire tread, as set forth in claim 14, where said triazine is selected from the group consisting of 2-chloro-4,6 bis(N-hexamethyleneimino)-1,3,5-triazine, 2-chloro-4,6-bis(anilino)-1,3,5-triazine, 2-chloro-4,6-bis(N-phenyl-p-phenylenediamino)-1,3,5-triazine, 2,4,6-triphenoxy-1,3,5-triazine, 1-ethoxy-4(dichloro-triazinyl)naphthalene, and (dichloro-triazinyl)-o-acetanisidide.

16. A tire tread, as set forth in claim 14, where said triazine is 2-chloro-4,6 bis(N-hexamethyleneimino)-1,3,5-triazine.

17. A tire tread, as set forth in claim 14, where said rubber tread stock includes an elastomer selected from 2,4,6-triphenoxy-1,3,5-triazine.

18. A tire tread, as set forth in claim 14, where said rubber tread stock includes a filler selected from the group consisting of carbon black and silica.

* * * * *

UNITED STATES PATENT AND TRADEMARK OFFICE
CERTIFICATE OF CORRECTION

PATENT NO. : 6,063,873  Page 1 of 1
DATED : May 16, 2000
INVENTOR(S) : David F. Lawson et al.

It is certified that error appears in the above-identified patent and that said Letters Patent is hereby corrected as shown below:

Column 18,
Delete formula "VI"; insert formula -- IV --,

Column 20,
Line 42, "(anilion)" should read -- (anilino) --.

Column 21,
Delete formula "VI"; insert formula -- IV --,

Column 24,
Delete formula "VI"; insert formula -- IV --.

Signed and Sealed this

Eighth Day of October, 2002

Attest:

JAMES E. ROGAN
Attesting Officer    Director of the United States Patent and Trademark Office